June 1, 1954    J. S. FRIDOLPH    2,679,986
DELAMINATING COMPOSITE WEB
Filed June 19, 1950    2 Sheets-Sheet 1
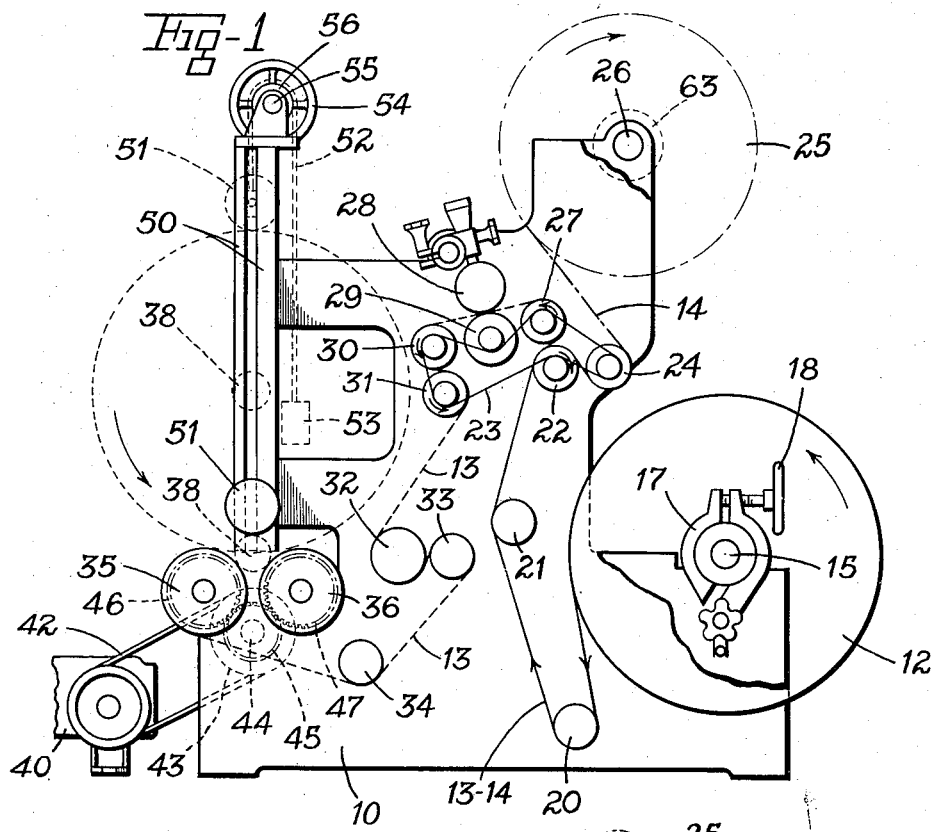
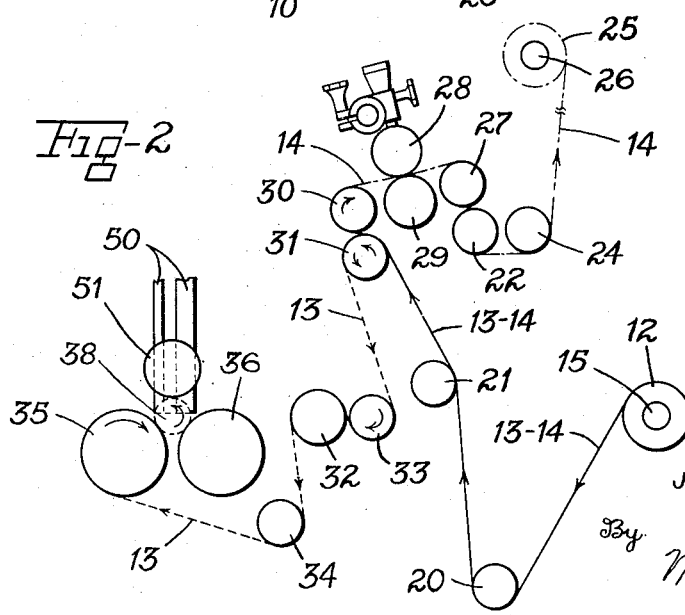
Inventor
JOHN S. FRIDOLPH
By Marechal & Biebel
ATTORNEYS

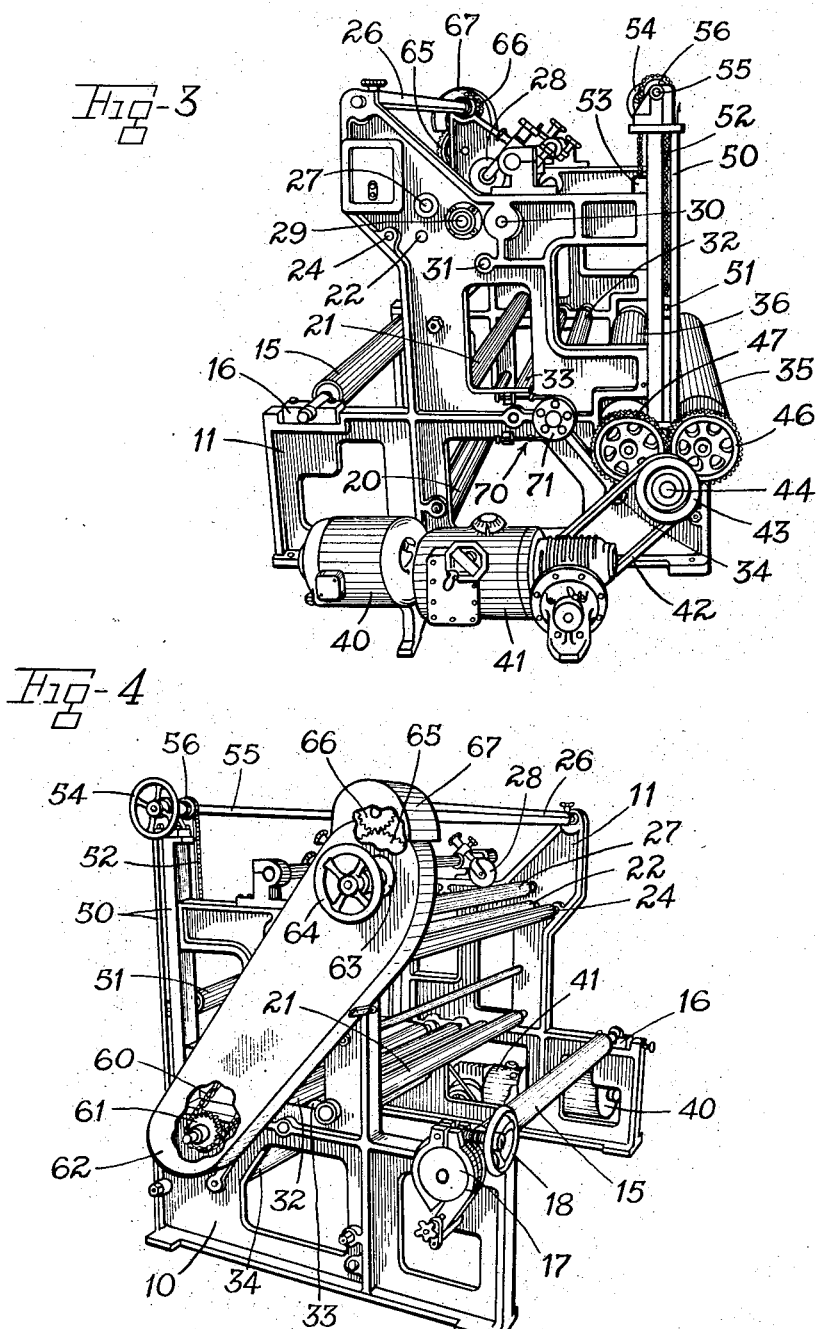

Patented June 1, 1954

2,679,986

UNITED STATES PATENT OFFICE 2,679,986

DELAMINATING COMPOSITE WEB

John S. Fridolph, Middletown, Ohio, assignor to Oxford Corporation, Dayton, Ohio, a corporation of Ohio Application June 19, 1950, Serial No. 168,940

3 Claims. (Cl. 242—66)

This invention relates to a machine and process for delaminating composite sheet or web material composed of plies or webs of substantially different characteristics as to strength, weight, stiffness and the like, and separately rewinding such webs.

In the production of plastic sheet material and the like it is the practice to form the plastic film as a continuous web upon a backing sheet which has relatively much greater strength and stiffness. The plastic sheet may vary substantially in its own characteristics but on the whole is usually quite limp and of low strength such that it is easily stretched and deformed. It may also vary in thickness and weight, and presents a serious problem from the standpoint of difficulty in handling during the operations of forming and subsequent rewinding.

Such plastic webs may be formed upon a backing sheet of relatively much stiffer and stronger sheet material, such as a continuous web of specially treated paper, fabric, or the like, and it is usually desirable to reuse this backing sheet repeatedly, stripping the formed plastic from the surface thereof as a continuous operation. The function of the present machine and process therefore is to "delaminate," i. e., to separate the formed plastic web from the backing strip, to separately rewind the plastic web and the backing strip, and to provide for such rewinding in a smooth and uniform manner, under properly controlled tension characteristics, so that the paper web can be subsequently reused in the formation of additional plastic sheet material, and the plastic web itself will be produced as a uniform roll in which the material is substantially closely wound but without creating sufficient tension to cause stretching, deformation, bunching, or ridging in the wound roll.

The plastic webs have low strength in tension and may have such a soft character that the sheet would easily deform under the weight of a roll thereof. Consequently the tension with which the plastic sheet is stripped and rewound is controlled under predetermined conditions while the rewinding itself is so carried out that the weight of the roll is properly supported and prevented from deforming the sheet being rewound. On the other hand a substantially greater tension is desirable in the rewinding of the backing sheet, this tension being separately controlled and the rewinding being carried out in such manner as to produce uniform characteristics. The machine thus is adapted for the convenient handling of such plastic and backing webs, delivering each of them in separately wound rolls of uniform characteristics and substantially free of objectionable stretching, ridging or wrinkling.

The invention likewise provides for the incorporation of additional functions including the slitting or trimming of either or both of the webs as may be desired, and proper guide rolls are positioned in order that the webs may be passed through the machine in different directions, and to bring about the cutting and separate rewinding of each or both of the webs, in accordance with individual desired results.

It is accordingly the principal object of the invention to provide a machine and method for delaminating a web which includes plies of substantially different characteristics, such as a web of plastic film material having relatively low strength and a backing web having greater strength, and rewinding the separate webs into rolls of uniform and smooth characteristics.

It is also an object of the invention to provide such machine and method for separating a laminated web of such characteristics and separately tensioning and controlling the rewinding of the plastic film web and the backing web under conditions properly controlled for the handling of each such material.

It is also an object to provide a machine which can be readily adjusted for different operations of this type, including the cutting or slitting of the material where desired, and the performing of such slitting or cutting operations upon either the composite web, or upon one or more of the components thereof.

Referring to the drawings—

Fig. 1 is a view partly in end elevation and partly diagrammatic showing the mechanism and method employed in connection with the invention, the web being threaded for one type of operation;

Fig. 2 is a diagrammatic view similar to Fig. 1 showing the web threaded for a different type of operation; and Figs. 3 and 4 are perspective views from opposite sides of the mechanism showing the structure employed.

Referring to the drawings which disclose a preferred embodiment of the invention the machine comprises main side frame members 10 and 11 which rest upon the floor and form the overall supporting frame structure. The unwinding roll is indicated at 12 comprising the composite or laminated web which, for purposes of description and illustration can be considered as composed of a relatively stiff paper backing web or ply 13 with a relatively soft and limp strippable plastic layer web or ply 14 superimposed thereon. These webs are indicated as a composite web 13—14 in the initial unwinding from roll 12, the roll being carried on a hub 15 supported in suitable bearings 16 in the frame members 10 and 11 respectively. In order to develop the proper unwinding tension, a brake 17 is shown, the brake being adjustable by hand wheel 18 to regulate the tension in the composite web.

The composite web 13—14 shown in full lines travels over guide rolls 20 and 21 from which it is delivered to a separating roll 22, all of these rolls being suitably journaled in the side frame members. Rolls 20 and 21 are mounted for free rotation while roll 22 is likewise mounted in the frame but is connected with a member such as sprocket chain 23 passing over a group of rolls which operates to maintain the surface speeds of all of such rolls the same.

The composite web having been separated at roll 22, the film portion 14 shown in dot dash lines passes under guide roll 24 over which chain 23 runs, the web then passing to the wind-up roll 25 journaled in bearings mounted in the upper part of the frame members. This roll has a central spool 26 which is yieldably driven to wind up the film in a smooth, uniform, and substantially unwrinkled manner, maintaining a uniform predetermined tension in the web and allowing it to rotate at a slower R. P. M. as the diameter of the roll increases.

Meanwhile the backing portion 13 of the web indicated in dotted lines passes over guide roll 27 and if desired through rotary cutters 28 which work against a back-up roll 29 and which either trim or slit the web as may be desired. Additional guide rolls 30 and 31 direct the web downwardly where a further series of rolls 32, 33 and 34 which are freely rotatable direct the web finally toward the outer roll 35 of a pair of rolls 35, 36 between which the wind-up spool 38 for the backing web is rotatably supported. It will be noted that each of rolls 27, 29, 30 and 31, while not positively driven, are all operated at the same rate of peripheral speed through chain 23.

The driving power is developed by the motor 40 secured at one side of the frame 11 and operating through an adjustable gear reduction 41 to drive a V-belt 42 which in turn drives the pulley 43 on stub shaft 44 mounted in the side frame members. Pulley 43 carries a gear 45 which has a direct gear connection 46, 47 with the pair of rolls 35, 36 and thus provides for driving such rolls with their surfaces rotating in the same direction and at a predetermined speed. As a result, under the driving action of the motor, the backing web traveling around the roll 35 and onto spool 38 will be wound up on the spool, as the spool rides in the recess between the two rolls. In order to assure positive drive of the backing web wind-up spool, especially at the beginning of the operation before it has reached any substantial size or weight, guide tracks 50 are provided at each side of the frame within which there rides a rotatable rider roll 51 counterbalanced through chains 52 and weights 53 so that it can be made to ride down against the wind-up spool 38 holding the latter in direct frictional driving engagement with rolls 35, 36. Control of the position of the roll 51 and the amount of weight thereon is determined by adjustment of hand wheel 54 on shaft 55 carrying a sprocket 56 over which the chains pass. As the winding proceeds and the size and weight of the wound roll become greater, the weight of roll 51 is less important and may be reduced but the provision of the surface drive for the rewind of the paper web assures the maintenance of the uniform rate of travel of the paper web, regardless of the size of the roll.

A drive connection is also made from the end of the roll 36 opposite that on which the drive gear 47 is located in the form of a sprocket chain 60 passing over a sprocket wheel 61 on the end of roll 36 and extending up to a driving position with respect to the film wind-up spool 26. A housing 62 encloses this drive and at its upper end a slip friction clutch 63 is provided between the drive and the spool 26. The tension on the clutch can be adjusted manually by means of the control wheel 64. The driven part of the clutch carries a gear wheel 65 meshing with a pinion 66 on the end of the shaft of spool 26, this part of the drive being enclosed within an auxiliary housing 67. This provides for the yieldable driving of the film wind-up spool 26 with a firm but gentle force while the provision of the slip friction clutch makes it possible to maintain substantially the same drive tension in the film web notwithstanding the variation in the speed of rotation of the spool as the diameter of the roll increases. Housing 62 also serves to enclose the sprocket chain 23 which causes the group of guide rolls to rotate at the same surface speed as described above.

It has been found important to provide for rewinding the relatively soft and limp film web by supporting and driving the spool on which it is wound rather than to allow the weight of the roll to ride against frictional drive rolls as in the case of the rewinding of the backing web since the character of the film is such that if the weight of the roll were acting continually against the surface, the surface would be deformed and it would be quite difficult to obtain a smooth and uniform rewinding of the film. Also, a relatively small amount of tension is developed in the film web 14 since the only retarding force on the film is the small force required to cause it to separate from the backing web and roll onto spool 26, the backing web 13 carrying the major part of the tension in the composite web developed by the brake 17. It is also found desirable to provide increased tension in the backing web 13, separate and apart from that in the film web 14, to assure that the former is properly rewound, and this is conveniently accomplished by means of a friction brake 70 associated with a drum 71 on the outer end of roll shaft 32, the tension of this brake being adjustable as desired to assure the proper rewinding tension on spool 38, without however increasing the tension in either the composite web or in web portion 14.

The machine is quite versatile and adaptable to different types of operation, one of which for example is shown in Fig. 2 where the composite web 13—14 is separated at roll 31, the paper web 13 continuing in a somewhat modified path over rolls 33, 32 and 34 respectively, without passing the slitter 28. The film web 14 first passes around guide roll 30 and then over the slitter 28 where it is trimmed or slit as desired. The film web then continues as either one or more webs, passing around rolls 27, 22 and 24, and from the latter passing onto the film spool 26 where it is rewound in the manner already described. It will be evident that other modified paths of travel, with or without slitting, may be established as may be desired.

The invention therefore provides a machine and method for delaminating composite webs which assures the rewinding of the separated webs separately on rolls or spools each of which is so handled throughout that a smooth, uniform and unwrinkled condition is established. The invention assures that the soft limp plastic film will be rewound without stretching, pulling, or wrinkling, and that the roll when completed will be well formed and not flattened due to the weight of the material itself. The paper web on the other hand being stiffer and of greater tensile strength is rewound in such manner that it likewise is smooth and uniform and is then available for subsequent reuse in the formation of additional plastic films.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. A machine for delaminating composite web material composed of a backing ply and a relatively soft plastic film ply which comprises means for supporting the composite roll for unwinding, adjustable brake means for controlling the tension in the composite web unwound from said roll, a spool for rewinding the backing ply following separation from said plastic film ply, a pair of surface drive rolls against which said spool is adapted to ride for positive driving of said spool by surface contact therewith, means for positively driving said surface contact rolls in the same direction relatively to each other, additional brake means effective upon the backing ply after separation from said plastic film ply for controlling the tension in said backing ply independently of the tension in said plastic film ply, a spool for rewinding the plastic ply, means for mounting said plastic film ply rewind spool for rotation thereof, and means for yieldably driving said plastic film rewind spool to rewind the plastic film ply directly thereon.

2. A method of delaminating and separately rewinding a composite web including a soft plastic film having low strength and a backing material of greater strength and stiffness which comprises applying a predetermined braking force to the roll of laminated material, separating said plastic ply from said backing ply, applying an additional braking force to said backing ply to establish a greater tension therein for rewinding, leading said backing ply to a wind-up roll, applying a surface driving force to said backing ply wind-up roll to effect rewinding thereof at substantially constant speed, leading said plastic film ply to a different rewind roll, and driving said plastic film rewind roll with a yieldable driving force from the roll itself to cause the smooth and uniform rewinding of said plastic web thereon.

3. The method of delaminating and separately rewinding a composite web including a backing ply and relatively soft limp plastic ply which comprises separating the composite web to form two separate webs, leading the backing web to a rewind spool resting in contact with a pair of surface driving members, positively driving the surface driving members to rotate said rewind spool at a substantially uniform linear speed, leading the plastic web to a separate spool, developing a substantial controlled tension in said composite web and in said backing ply following separation with only a limited tension in said plastic ply, and yieldably driving said separate spool without direct contact with the surface thereof with a continuously applied substantially lesser driving force than that applied to said rewinding spool and at a progressively decreasing rate of rotation as determined by the speed of said rewinding spool.

References Cited in the file of this patent

UNITED STATES PATENTS

| Number | Name | Date |
|---|---|---|
| 1,505,425 | Raber | Aug. 19, 1924 |
| 1,753,174 | Russell | Apr. 1, 1930 |
| 1,757,935 | Maas | May 6, 1930 |
| 1,819,989 | Stevens | Aug. 18, 1931 |
| 1,827,802 | Sieg | Oct. 20, 1931 |
| 2,034,063 | Stacey | Mar. 17, 1936 |
| 2,050,794 | Humphner | Aug. 11, 1936 |
| 2,188,210 | Smith | Jan. 23, 1940 |
| 2,199,594 | Kent | May 7, 1940 |
| 2,276,980 | Jacobi | Mar. 17, 1942 |
| 2,428,653 | Collins | Oct. 7, 1947 |
| 2,508,484 | Barkstrom et al. | May 23, 1950 |